United States Patent [19] [11] 4,280,279
Grundfest [45] Jul. 28, 1981

[54] ALIGNMENT TOOL

[75] Inventor: Michael A. Grundfest, Forest Hills, N.Y.

[73] Assignee: Thomas & Betts Corporation, Raritan, N.J.

[21] Appl. No.: 71,274

[22] Filed: Aug. 30, 1979

[51] Int. Cl.³ .............................................. G01B 3/00
[52] U.S. Cl. .............................. 33/180 R; 33/174 G; 269/41
[58] Field of Search ............ 33/180 R, 185 R, 174 G; 83/97 C; 269/41, 40, 321 WE, 44

[56] References Cited
U.S. PATENT DOCUMENTS
121,851 12/1871 Cornish .................................. 269/41
2,654,153 10/1953 Oyler ..................................... 33/474

FOREIGN PATENT DOCUMENTS
2245982 9/1972 Fed. Rep. of Germany ........ 83/97 C
2756074 7/1979 Fed. Rep. of Germany ............. 269/41

OTHER PUBLICATIONS
Publication, "Undercarpet Wiring System Installation Kit", Electronic Design 10/15/58.
"Self-Locating Drill Jig", American Mechanic, Feb. 23, 1928, pp. 349, 350.

Primary Examiner—Willis Little
Attorney, Agent, or Firm—Robert M. Rodrick; Jesse Woldman

[57] ABSTRACT

A tool for selectively aligning the conductors of a first multiconductor flat cable with selected conductors of a second multiconductor flat cable comprising a base plate having handle means to position the tool with respect to said cables, a first stop means to engage a first edge of the first cable and position same with respect to said base plate and second stop means to engage a first edge of a second cable and position such cable with respect to said base plate and in orthogonal overlapping relationship to said first cable aligning selected conductors of each cable. Edge guides align the cable edges on the base plate and guide pins provide mating contact with associated apertures in insulation means to align the insulation with the overlapping portions of both cables.

10 Claims, 4 Drawing Figures

ALIGNMENT TOOL

BACKGROUND OF THE INVENTION

1. Field of the Invention

The invention finds utility in the coupling and splicing of electrical cables and the insulating of the resultant joints and more particularly to so called flat cables.

2. Description of the Prior Art

Prior art cables of a generally flattened configuration often termed "ROMEX" are composed of three or more individually insulated conductors in a side-by-side relationship enclosed in a thermoplastic insulator having flat top and bottom faces and rounded end faces. To join conductors of two such cables the outer insulator was split and the conductors splayed out. Selected conductors would then be joined by appropriate connectors and the joint insulated by the connector itself (self-contained devices) or by splice covers, or by taping or the like. No one tool was available to align the cables for coupling and splicing and assisting in the insulation of the resulting joint. Various cutting, stripping, splicing, taping, etc. devices could be used by the skilled electrician.

SUMMARY OF THE INVENTION

The present invention overcomes the difficulties noted with respect to prior art types of cables by providing for modern flat cables an alignment tool to permit the correct positioning of the selected conductors of two overlapping, orthogonally positioned flat cables so that such selected conductors can be coupled or spliced and to provide a fixture for the positioning of insulation means for the resulting cable joint. The alignment tool has a base plate with handle means thereon to permit the plate to be positioned with respect to the cables to be coupled or spliced. A first stop means on the base plate engages a first edge of a first cable and positions same with respect to the base plate. A second stop means on the base plate engages a first edge of a second cable and positions such cable with respect to said base plate and in orthogonal, overlapping relationship to the first cable aligning selected conductors of each cable. Edge guides align the cable edges on the base plate and guide pins provide mating contact with associated apertures in insulating means to align the insulation above and below the overlapping portions of both cables to insulate the joint therebetween. It is therefore an object of this invention to provide an alignment tool for two multiconductor flat cables by which selected conductors of each can be properly positioned with respect to one another.

It is an object of this invention to provide an alignment tool by which the conductors of two multiconductor flat cables can be orthogonally aligned.

It is another object of this invention to provide an alignment tool for two multiconductor flat cables which also provides for the positioning of insulation means with respect to the overlapped portions of such cables.

Other objects and features of the invention will be pointed out in the following description and claims and illustrated in the accompanying drawings, which disclose by way of example, the principles of the invention and the best mode which has been contemplated for carrying it out.

BRIEF DESCRIPTION OF THE DRAWINGS

In the drawings in which similar elements are given similar reference characters.

Figure 1:
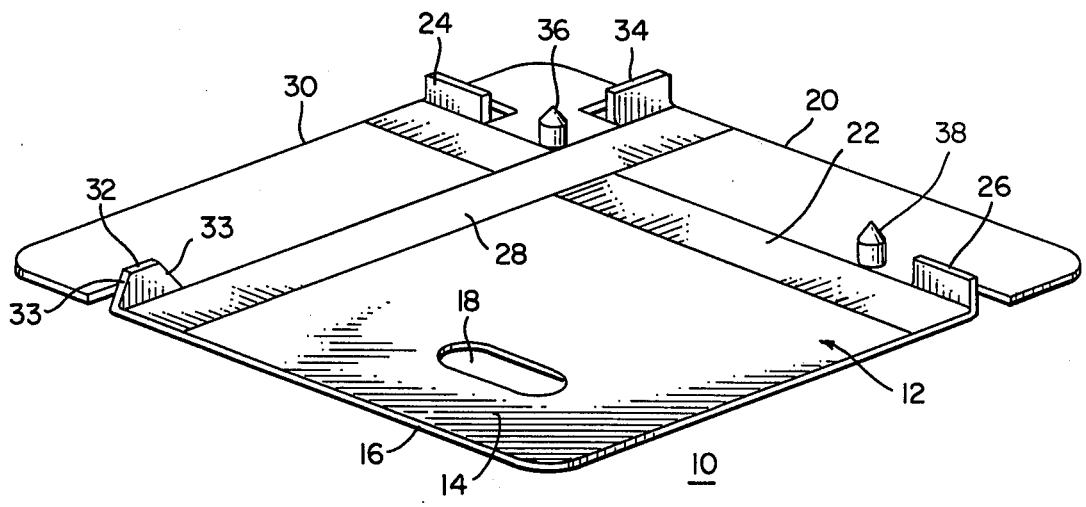
FIG. 1 is a perspective view of an alignment tool constructed in accordance with the concepts of the invention.

DESCRIPTION OF THE PREFERRED EMBODIMENTS:

Referring to FIG. 1, there is shown an alignment tool 10 constructed in accordance with the concepts of the invention. Generally rectangular base plate 12 has a handle 14 formed between a first edge 16 and a cutout 18. Spaced apart from a second edge 20, parallel with first edge 16, is an edge guide 22 to define the path of a first multiconductor flat cable across the face of the base plate 12. A first stop means is created by the lanced tabs 24, 26 struck from the base plate 12 and extended normal to the surface of such plate. These tabs 24, 26 will engage a first edge of a first flat cable passed over base plate 12 and insure that such edge will be congruent with edge guide 22. A second edge guide 28 orthogonal to the edge guide 22 is parallel with and spaced apart from an edge 30. A second stop means is created by the lanced tabs 32, 34 struck from the base plate 12 and extended normal to the surface of base plate 12. The leading and trailing edges 33 of tab 32 are tapered to facilitate insertion of the plate 12 under a flat cable or its removal therefrom. Tabs 32, 34 will engage a first edge of a second flat cable passed over base plate 12 and insure that such edge will be congruent with the edge guide 28. Edge guides 22, 28 give a visual check on the cable alignments and a check as to the correctness of the edges of the cables themselves.

Positioned at the intersection of edge guides 22, 28 is a guide pin 36. A further guide pin 38 is positioned adjacent the edge guide 22 close to tab 26. Guide pins 36, 38 will be employed to position insulation material over the joint between the conductors of the two cables where they overlie one another, as will be set forth below.

Figure 2:
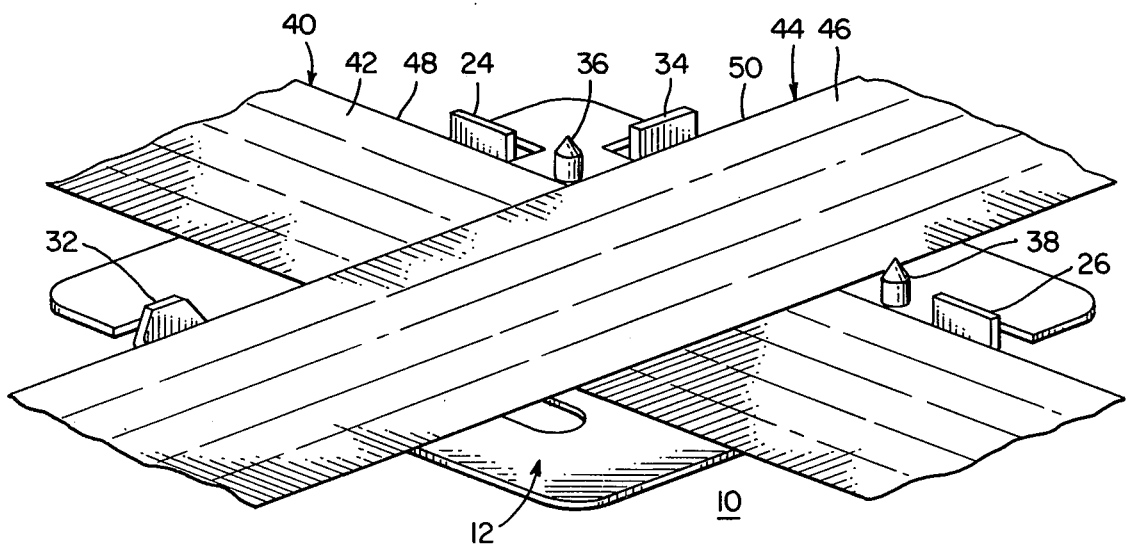
FIG. 2 shows the tool of FIG. 1 with two mutliconductor flat cables positioned thereon.

Turning now to FIG. 2, the manner in which alignment tool 10 is employed to align the individual conductors 42 of a first multiconductor flat cable 40 with the individual conductors 46 of a second multiconductor flat cable 44 is shown. Flat cable 40, designated the main branch cable, is positioned with its first edge 48 against tabs 24, 26 and along edge guide 22 (not visible). Next, flat cable 44, designated the top branch cable, is positioned over and orthogonal with flat cable 40. The first edge 50 of cable 44 is brought into contact with tabs 32, 34 and along edge guide 28 (not visible). This positions each of the conductors 42 of cable 40 with respect to the conductors 46 of cable 44 permitting the selective coupling thereof as required. The coupling may be carried out by various insulation and oxide piercing connectors crimped to the cables or by more conventional stripping and crimping techniques. In the event the positions of either of the cables 40 or 44 is fixed the alignment tool 10 can be conveniently moved into position with the cable by use of handle 14.

Figure 3:
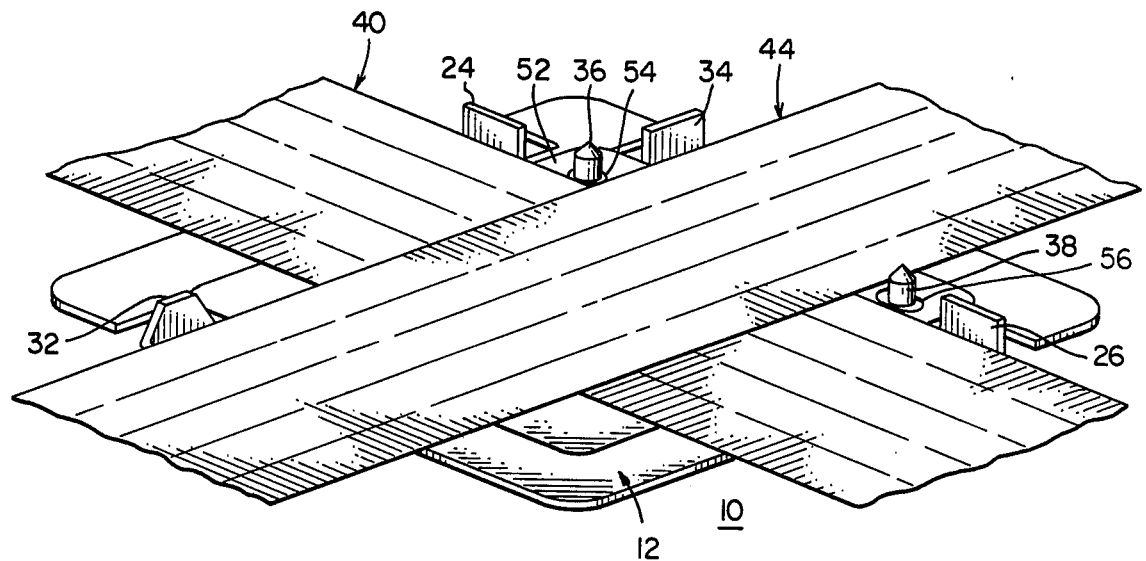
FIG. 3 shows the tool and installed conductors of FIG. 2 with a lower insulator installed thereto.

After coupling or splicing the cables 40, 44, the exposed connectors (not shown) must be insulated to protect the integrity of the joint. To do this an insulation pad 52 is employed. Insulation pad 52 is made of rubber, or plastic, or other suitable insulating material and has one surface thereof coated with a pressure-sensitive adhesive for adherence to the surface of the cables. A release paper protects the adhesive layer prior to use. Pad 52 has a round aperture 54 to receive guide pin 36 and a somewhat elongated slot 56 to receive guide pin 38. The elongated slot 56 permits alignment of pad 52 despite variations in the joint height. Once cables 40 and 44 have been joined by means not shown the cables are lifted from base plate 12 and the pad 52 with its adhesive coating up and its release paper removed is placed on the base plate 12 with guide pin 36 in aperture 54 and guide pin 38 in slot 56. The cables 40 and 44 are then aligned with pad 52 using the tabs 24, 26 to guide cable 40 and tabs 32, 34 to guide cable 44. Once so positioned, the cables 40, 44 are pressed into contact with insulation pad 52 to adhere the pad 52 thereto, as is shown in FIG. 3.

Figure 4:
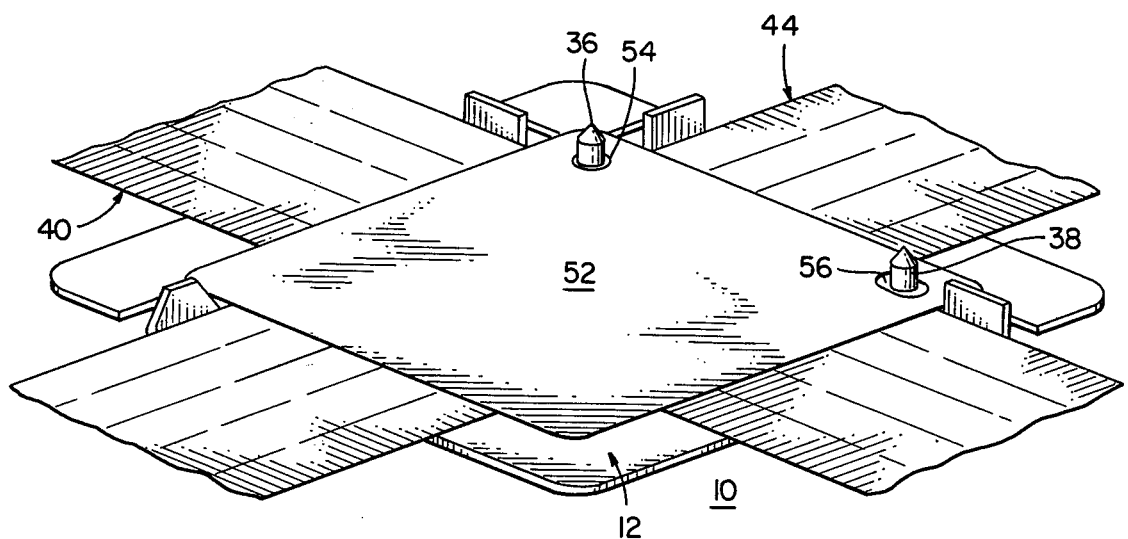
FIG. 4 shows the tool and installed conductors of FIG. 3 with the upper insulator installed thereon.

To insulate the top side of the joint, a second insulation pad 52 having aperture 54 and slot 56 therein is used. With the release paper removed and with the adhesive layer facing the cable joint, the pad 52 is aligned with the joint using guide pin 36 in aperture 54 and guide pin 38 in slot 56 and then pressing into contact with the cables, as is shown in FIG. 4. The exposed edge portions of the pads 52 are pressed together beyond the cables to further protect the joint.

While there has been shown and described and pointed out the fundamental novel features of the invention as applied to the preferred embodiment, it will be understood that various omissions and substitutions and changes of the form and details of the devices illustrated and in its operation may be made by those skilled in the art, without departing from the spirit of the invention.

The embodiments of the invention in which an exclusive property or privilege is claimed are defined as follows:

1. An alignment tool for aligning selected conductors of a first multiconductor flat cable with selected conductors of an overlapping second multiconductor flat cable comprising: a base plate having a cable contact surface; first stop means projecting from said surface of said base plate to engage a first edge of a first multiconductor flat cable and align same with respect to said base plate; second stop means projecting from said surface of said base plate to engage a first edge of an overlapping second multiconductor flat cable; and guide means on said surface defining mutually intersecting paths for said first and second cables, each such paths extending beyond the point of intersection and being congruent with one of said first and second stop means to align selected conductors of said overlapping second flat cable in a fixed angular orientation with selected conductors of said first flat cable in a fixed angular oriention.

2. An alignment tool as defined in claim 1, wherein said first stop means is formed integrally with said base plate.

3. An alignment tool as defined in claim 1, wherein said second stop means is formed integrally with said base plate.

4. An alignment tool as defined in claim 1, wherein said first and said second stop means are formed integrally with said base plate.

5. An alignment tool as defined in claim 1, wherein each of said first and second stop means comprises at least two spaced-apart stop elements disposed on said surface to engage said first edge of said first and second multiconductor flat cables, respectively.

6. An alignment tool as defined in claim 5, wherein said guide means comprises a first edge guide extending between said two spaced-apart stop elements of said first stop means to define the path of said first edge of said first flat cable across said base plate and a second edge guide extending between said two spaced-apart stop elements of said second stop means to define the path of said first edge of said second flat cable across said base plate and said first flat cable, said first edge guide and second edge guide intersecting substantially orthogonally.

7. An alignment tool as defined in claim 1 further comprising alignment pins for engaging corresponding apertures on insulation means to align such insulation with the overlapping portions of said first and second flat cables.

8. An alignment tool as defined in claim 7, wherein said alignment pins comprise two pins aligned with said first edge of said first flat cable.

9. An alignment tool as defined in claim 8, wherein one of said two pins is positioned adjacent the intersection of said first edge of said first flat cable and said first edge of said second flat cable.

10. An alignment tool as defined in claim 1, wherein said base plate further comprises a handle to facilitate the positioning of said tool with respect to said first and said second flat cables.

* * * * *